(12) United States Patent
Choi et al.

(10) Patent No.: US 11,985,580 B2
(45) Date of Patent: *May 14, 2024

(54) ELECTRONIC SYSTEM FOR ELECTRONIC DEVICE

(71) Applicant: SAMSUNG ELECTRONICS CO., LTD., Suwon-si (KR)

(72) Inventors: Woo Young Choi, Seongnam-si (KR); Dong Yun Kim, Yongin-si (KR); Ivan Galkin, Suwon-si (KR); Ji-Hoon Park, Suwon-si (KR); Jong-Jin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,677

(22) Filed: Jun. 27, 2023

(65) Prior Publication Data

US 2023/0345219 A1   Oct. 26, 2023

Related U.S. Application Data

(60) Division of application No. 17/836,191, filed on Jun. 9, 2022, now Pat. No. 11,700,519, which is a continuation of application No. 16/702,065, filed on Dec. 3, 2019, now Pat. No. 11,368,829.

(30) Foreign Application Priority Data

Jun. 7, 2019   (KR) ........................ 10-2019-0067343

(51) Int. Cl.
*H04W 4/70* (2018.01)
*G06F 9/445* (2018.01)
*H04L 67/125* (2022.01)
*H04W 4/80* (2018.01)
*H04W 76/28* (2018.01)

(52) U.S. Cl.
CPC .......... *H04W 4/70* (2018.02); *G06F 9/44573* (2013.01); *H04L 67/125* (2013.01); *H04W 4/80* (2018.02); *H04W 76/28* (2018.02)

(58) Field of Classification Search
CPC ......... H04W 4/70; H04W 76/28; H04W 4/80; G06F 9/44573; H04L 67/125
See application file for complete search history.

(56) References Cited

U.S. PATENT DOCUMENTS

| | | | |
|---|---|---|---|
| 6,018,763 A * | 1/2000 | Hughes | H04L 49/901 709/213 |
| 7,143,442 B2 | 11/2006 | Scarfe et al. | |
| 8,446,838 B2 | 5/2013 | Nagasaki | |
| 8,576,626 B2 | 11/2013 | Lee et al. | |
| 9,781,259 B1 | 10/2017 | Kodaypak | |

(Continued)

FOREIGN PATENT DOCUMENTS

EP   3 282 769 A2   2/2018

*Primary Examiner* — Sargon N Nano
(74) *Attorney, Agent, or Firm* — Muir Patent Law, PLLC

(57) ABSTRACT

An electronic device includes a narrowband internet of things (NB-IoT) circuit; a shared central processor to control the narrowband internet of things circuit; a shared memory to store data or code from the shared central processor; and a communicator controlled by the shared central processor. The communicator stores the data or the code in the shared memory.

14 Claims, 7 Drawing Sheets

(56) References Cited

U.S. PATENT DOCUMENTS

| | | | |
|---|---|---|---|
| 9,910,676 B1 | 3/2018 | Nair et al. | |
| 9,942,852 B2 | 4/2018 | Hsu et al. | |
| 10,651,903 B2* | 5/2020 | Luo | G06F 17/153 |
| 10,743,199 B1* | 8/2020 | Patil | H04W 52/265 |
| 10,805,178 B2 | 10/2020 | Livanos et al. | |
| 10,880,829 B2 | 12/2020 | Huang et al. | |
| 11,140,634 B2 | 10/2021 | Ye et al. | |
| 2001/0052053 A1 | 12/2001 | Nemirovsky et al. | |
| 2004/0186949 A1 | 9/2004 | Liu et al. | |
| 2007/0174449 A1 | 7/2007 | Gupta | |
| 2010/0122268 A1 | 5/2010 | Jia | |
| 2015/0143032 A1 | 5/2015 | Hashimoto | |
| 2017/0177870 A1 | 6/2017 | Hildebrand | |
| 2017/0201393 A1 | 7/2017 | Gaal et al. | |
| 2018/0049181 A1* | 2/2018 | Wu | H04L 67/12 |
| 2018/0098293 A1 | 4/2018 | Jiang et al. | |
| 2018/0150299 A1 | 5/2018 | Balle et al. | |
| 2018/0165157 A1 | 6/2018 | Olinsky et al. | |
| 2018/0187954 A1 | 7/2018 | Yang et al. | |
| 2018/0192271 A1 | 7/2018 | Kim et al. | |
| 2018/0206188 A1 | 7/2018 | Nam et al. | |
| 2018/0213575 A1 | 7/2018 | Chen | |
| 2018/0246766 A1 | 8/2018 | Holmberg et al. | |
| 2018/0328079 A1 | 11/2018 | Lim et al. | |
| 2018/0329820 A1 | 11/2018 | Sinha et al. | |
| 2018/0331965 A1 | 11/2018 | Tandel et al. | |
| 2018/0343132 A1 | 11/2018 | Maheshwari et al. | |
| 2018/0352593 A1* | 12/2018 | Velev | H04W 76/12 |
| 2018/0376417 A1* | 12/2018 | Wang | H04L 67/12 |
| 2019/0014137 A1 | 1/2019 | Du et al. | |
| 2019/0045561 A1 | 2/2019 | Gupta et al. | |
| 2019/0069211 A1 | 2/2019 | Ronneke et al. | |
| 2019/0069235 A1* | 2/2019 | Patil | H04W 52/0216 |
| 2019/0116574 A1* | 4/2019 | Wu | H04W 64/00 |
| 2019/0146812 A1 | 5/2019 | Rudelic | |
| 2019/0373573 A1 | 12/2019 | Cui et al. | |
| 2019/0394712 A1 | 12/2019 | Ronneke | |
| 2020/0029302 A1 | 1/2020 | Cox et al. | |
| 2020/0322891 A1 | 10/2020 | Ostman et al. | |
| 2020/0349109 A1 | 11/2020 | Natanzon et al. | |
| 2020/0351633 A1 | 11/2020 | Hoglund et al. | |
| 2020/0367069 A1 | 11/2020 | Struhsaker et al. | |
| 2021/0144641 A1 | 5/2021 | Sun et al. | |
| 2021/0321304 A1 | 10/2021 | Karampatsis et al. | |
| 2022/0038286 A1 | 2/2022 | Shaw | |

* cited by examiner

ELECTRONIC SYSTEM FOR ELECTRONIC DEVICE

CROSS-REFERENCE TO RELATED APPLICATIONS

This is a division of application Ser. No. 17/836,191, filed Jun. 9, 2022, which in turn is a continuation of application Ser. No. 16/702,065, filed on Dec. 3, 2019, now U.S. Pat. No. 11,358,829 B2, issued Jun. 21, 2022, the entire contents of both being hereby incorporated by reference.

Korean Patent Application No. 10-2019-0067343, filed on Jun. 7, 2019, in the Korean Intellectual Property Office, and entitled: "Electronic Device and System for the Same," is incorporated by reference herein in its entirety.

BACKGROUND

1. Field

Embodiments relate to an electronic device and a system thereof, and more particularly, relate to an electronic device and a system thereof including an Internet of Things (IoT) module.

2. Description of the Related Art

Internet of Things (IoT) has been in the spotlight as a new service for next-generation mobile communications and has attracted a great deal of attention mainly by telecommunication carriers and terminal manufacturers. Thus, standardization organizations, e.g., 3rd Generation Partnership Project (3GPP), have standardized communication techniques for IoT. For example, release-13 of the 3GPP has standardized Cat-M1 and NarrowBand Internet of Things (NB-IoT). Further, various IoT communication techniques, e.g., long range (LoRa), SigFox, and the like, have been proposed.

SUMMARY

Embodiments are directed to an electronic device. The electronic device may include a narrowband internet of things (NB-IoT) circuit; a shared central processor (CPU) to control the narrowband internet of things circuit; a shared memory to store data or code from the shared central processor; and a communicator controlled by the shared central processor. The communicator stores the data or the code in the shared memory.

Embodiments are directed to an electronic device. The electronic device may include a shared central processor to transmit and receive code to and from an external storage device during a booting period from a first time to a third time, and to transmit or receive data to and from the external storage device during a data transfer period from a third time to a fourth time; a narrowband internet of things circuit that is booted at a second time between the first time and the third time, the narrowband internet of things circuit to receive the data during a paging time between a fifth time and a sixth time after the fourth time and not to transmit or receive the data during an idle period; and a communicator to operate during at least a part of the idle period.

Embodiments are directed to an electronic system. The electronic system may include an integrated circuit including a narrowband internet of things circuit and a communicator; a bus connected to the integrated circuit, the bus to transmit and receive data and code; and an application processor to transmit and receive the data and the code through the bus. The integrated circuit includes a shared central processor and a shared memory connected to the narrowband internet of things circuit and the communicator.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
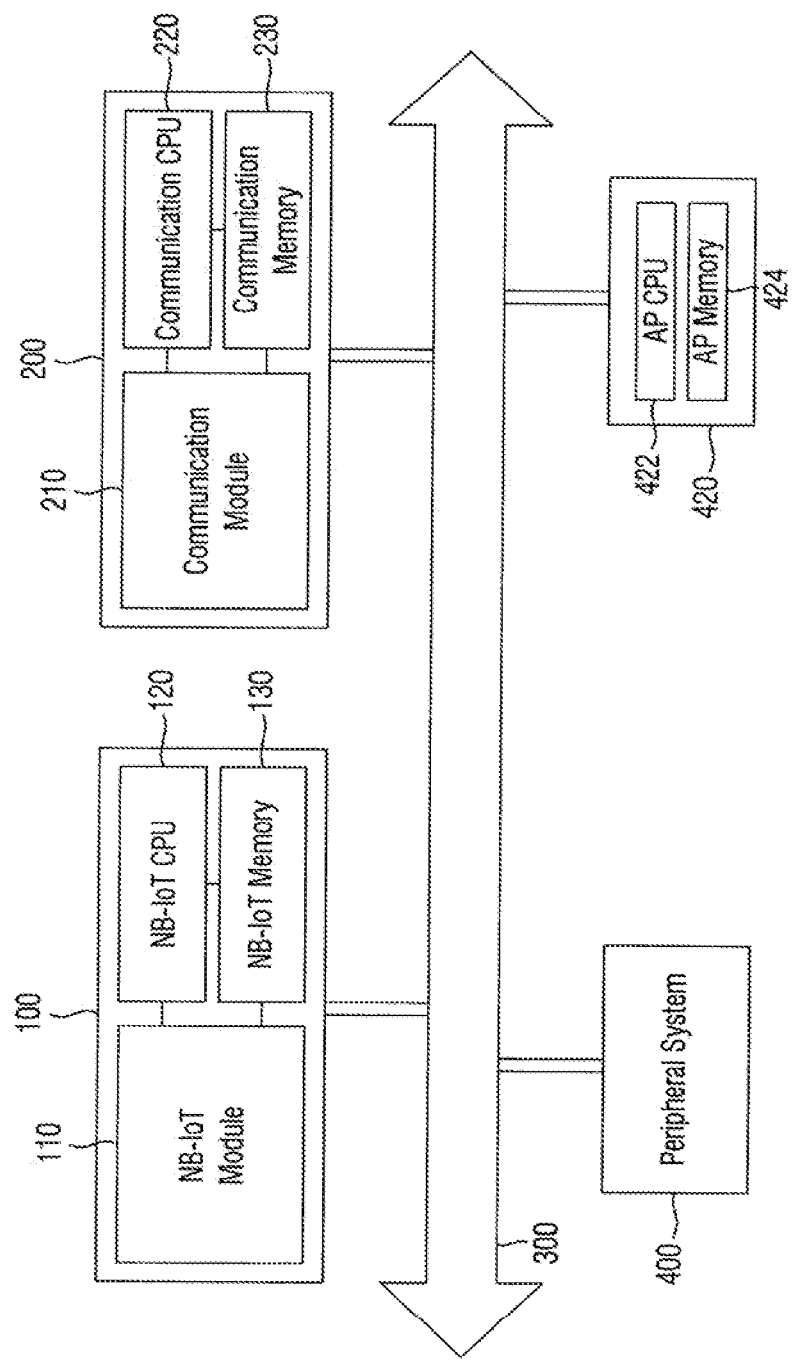
FIG. 1 illustrates an example of a conventional electronic device including a narrowband internet of things (IoT) module.

In an example embodiment, an electronic device supporting NarrowBand Internet of Things (NB-IoT) may include at least one of a smartphone, a tablet PC, a mobile phone, a video phone, an electronic book reader, a desktop PC, a laptop PC, a netbook computer, a workstation, a server, a personal data assistant (PDA), a portable multimedia player (PMP), a Motion Picture Experts Group-1 audio layer-3 (MP3) player, a medical device, a camera, a wearable device, and the like. Further, in some embodiments, the electronic device supporting the NB-IoT may include at least one of a television, a digital video disk (DVD) player, an audio device, a refrigerator, an air conditioner, a vacuum cleaner, an oven, a microwave oven, a washing machine, an air purifier, a set-top box, a home automation control panel, a security control panel, a media box (e.g., Samsung HomeSync™, Apple TV™ or Google TV™), a game consoles (e.g., Xbox™, and PlayStation™), an electronic dictionary, an electronic key, a video camera or electronic frames, and the like. Further, in an example embodiment, the electronic device may include at least one of various medical devices, a navigation device, a global navigation satellite system (GNSS), an event data recorder (EDR), a flight data recorder (FDR), an automobile infotainment device, a marine communication device (e.g., a marine navigation communication device, a gyrocompass device, etc.), an avionics, a security device, an automobile head unit, an industrial or home robot, a drone, a module for automatic telling machine (ATM) of financial institutions, point of sales (POS) of shop, or bulbs, various sensors, a sprinkler device, a fire alarm, a temperature controller, a street light, a toaster, an exercise device, a hot water tank, a heater, a boiler, and the like. In an example embodiment, the electronic device may also include at least one of a furniture module, building/structure or a part of an automobile, an electronic board, an electronic signature receiving device, a projector module or various measuring devices, e.g., water supply, electricity, gas, or radio wave measuring devices, and the like. Further, in some embodiments, the electronic device supporting the NB-IoT may be a combination of two or more of various devices described above.

Hereinafter, the narrowband internet of things (NB-IoT) according to some embodiments is a technique newly introduced for low power wide area (LPWA) in 3GPP release-13. The NB-IoT may use bandwidth reduced up to 180 kHz. The NB-IoT may be operated in three types, depending on the operating frequency. First, the NB-IoT may be operated in any one type of an in-band operation, a guard band operation, and a stand alone operation, depending on a relationship with a long-term evolution (LTE) carrier wave. The in-band operation may be a type that uses resources in an LTE frequency band, the guard band operation may be a type that uses guard band defined in the LTE frequency band, and the stand alone operation may be a type that uses a global system for mobile (GSM) frequency band or a potential IoT dedicated frequency band. In the case of the guard band operation, NB-IoT communication may be allowed without additional bandwidth allocation. A downlink communication NB-IoT may use a 15 kHz subcarrier spacing and may use a 180 KHz band corresponding to one PRB (physical resource block). In the case of an uplink communication, two subcarrier spacings of 3.75 kHz and 15 kHz may be supported, a single-tone transfer may support both 3.75 kHz and 15 kHz, and multi-ton transfer may only support 15 kHz. As a result, the 3GPP standard may be defined category-NB1 (Cat-NB1), which is a new terminal category for NB-IoT.

Hereinafter, a communication module chipset according to some embodiments may include, e.g., a cellular module, a WiFi module, a Bluetooth module, a GNSS module, a near field communication (NFC) module, and a radio frequency (RF) module. The cellular module may provide, for example, a voice call, a video call, a text service, an Internet service, or the like through a communication network. According to an embodiment, the cellular module may distinguish and authenticate the electronic devices within the communication network, using, e.g., a subscriber identity module (SIM) card. According to some embodiments, the cellular module may perform at least some of the functions that may be provided by the application processor central processing unit 422. According to an embodiment, the cellular module may include a communication processor (CP). According to some embodiments, at least some of the cellular module, the WiFi module, the Bluetooth module, the GNSS module or the NFC module may be included in one integrated chip (IC) or IC package. The RF module may transmit and receive, for example, a communication signal, e.g., an RF signal. The RF module may include, e.g., a transceiver, a power amp module (PAM), a frequency filter, a low noise amplifier (LNA), an antenna, or the like. According to another embodiment, at least one of the cellular module, the WiFi module, the Bluetooth module, the GNSS module or the NFC module may transmit and receive the RF signal through another RF module. The subscriber identity module may include, e.g., a card or an embedded SIM including the subscriber identity module, and may include unique identification information, e.g., integrated circuit card identifier (ICCID) or subscriber information, e.g., international mobile subscriber identity (IMSI).

FIG. 1 illustrates an example of a conventional electronic device including a narrowband internet of things module. Referring to FIG. 1, a conventional electronic device supporting the narrowband internet of things may include a narrowband internet of things chipset 100, a communication module chipset 200, a peripheral system 400 and an application processor block 420 connected through a bus 300.

The narrowband internet of things chipset 100 of the conventional electronic device supporting the narrowband internet of things may include a narrowband internet of things central processing unit 120 and a narrowband internet of things memory 130 connected to a narrowband internet of things module 110. The narrowband internet of things central processing unit 120 and the narrowband internet of things memory 130 may be connected to each other.

The narrowband internet of things memory 130 may store control command code, control data or user data for controlling the narrowband internet of things module 110. The narrowband internet of things memory 130 may include at least one of a volatile memory or a nonvolatile memory. The nonvolatile memory includes a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), a Ferroelectric RAM (FRAM), and the like. The volatile memory may include at least one of various memories, e.g., a Dynamic RAM (DRAM), a Static RAM (SRAM), a Synchronous DRAM (SDRAM), a Phase-change RAM (PRAM), a Magnetic RAM (MRAM), a Resistive RAM (RRAM), and a Ferroelectric RAM (Fe-RAM).

A communication module chipset 200 of the conventional electronic device supporting the narrowband internet of things may include a communication central processing unit 220 and a communication memory 230 connected to the communication module 210. The communication central processing unit 220 and the communication memory 230 may be connected to each other.

The peripheral system 400 of the conventional electronic device supporting the narrowband internet of things may be connected to the bus 300 and connected to the narrowband internet of things chipset 100 and the communication module chipset 200. The peripheral system 400 may communicate with the narrowband internet of things chipset 100 and the communication module chipset 200 through the bus 300. The peripheral system 400 may include, e.g., a clock management unit, a power management unit, a timer, an interrupt control unit, an RF circuit, or the like.

The application processor block 420 of the conventional electronic device supporting the narrowband internet of things may be connected to the narrowband internet of things chipset 100 and the communication module chipset 200 through the bus 300 for communicating with each other. The application processor block 420 may include an application processor central processing unit 422 and an application processor memory 424. The application processor block 420 may control overall operations of the narrowband internet of things chipset 100. The application processor block 420 may execute applications that are related to, e.g., an Internet browser, a game, a moving image, or the like. According to some embodiments, the application processor central processing unit 422 of the application processor block 420 may include one processor core (Single Core) or a plurality of processor cores (Multi-Core). For example, the application processor central processing unit 422 may include a multi-core, e.g., a dual-core, a quad-core, and a hexa-core. Further, according to some embodiments, the application processor memory 424 of the application processor block 420 may further include a cache memory.

In the conventional electronic device supporting the narrowband internet of things, the narrowband internet of things chipset 100 and the communication module chipset 200 may be implemented as separated chipsets. Thus, physical areas occupied by the narrowband internet of things central processing unit 120 and the narrowband internet of things memory 130 of the narrowband internet of things chipset 100 and the communication central processing unit 220 and the communication memory 230 of the communication module chipset 200 may increase. Thus, the narrowband internet of things chipset 100 and the communication module chipset 200 in the conventional electronic device may require an efficient integration to reduce the physical areas therefor. In contrast, according to some embodiments, a narrowband internet of things chipset and a communication module chipset of an electronic device supporting the narrowband internet of things may share a memory and a central processing unit to reduce physical areas therefor. Thus, the electronic device including the shared memory and the shared central processing unit may have a higher integration degree.

The application processor block 420 may include an application processor central processing unit 422 and an application processor memory 424. The application processor central processing unit 422 may control the narrowband internet of things chipset 100, the communication module chipset 200, and the peripheral system 400. The application processor memory 424 may store code and/or data associated with the application processor central processing unit 422.

Figure 2:
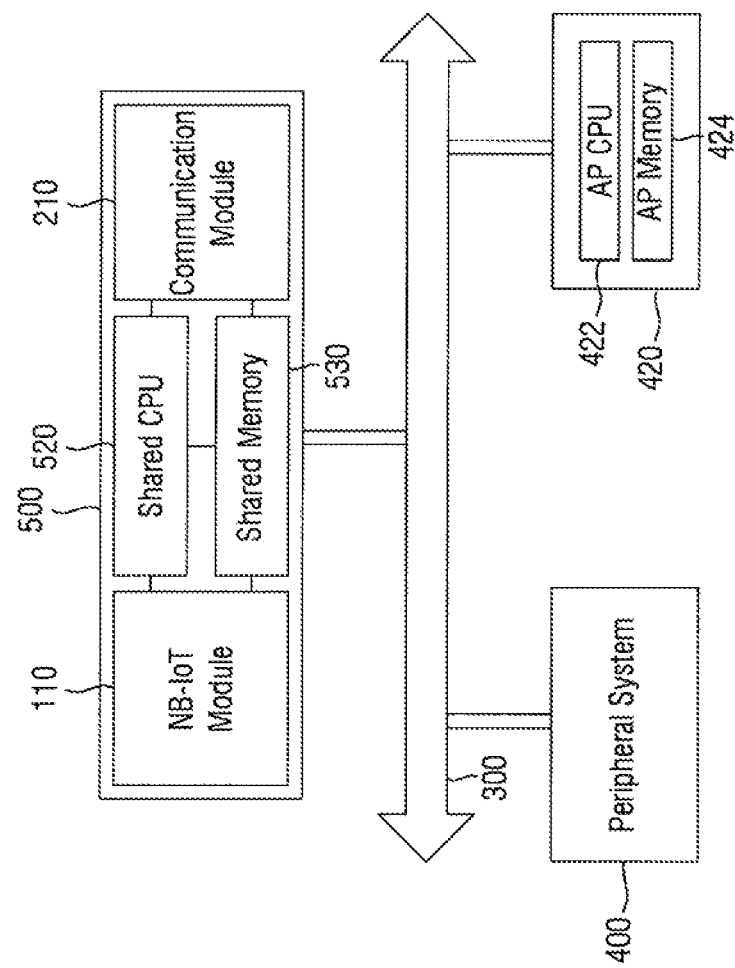
FIG. 2 illustrates an example of an electronic device and a system that support the narrowband internet of things according to some embodiments.
Figure 3:
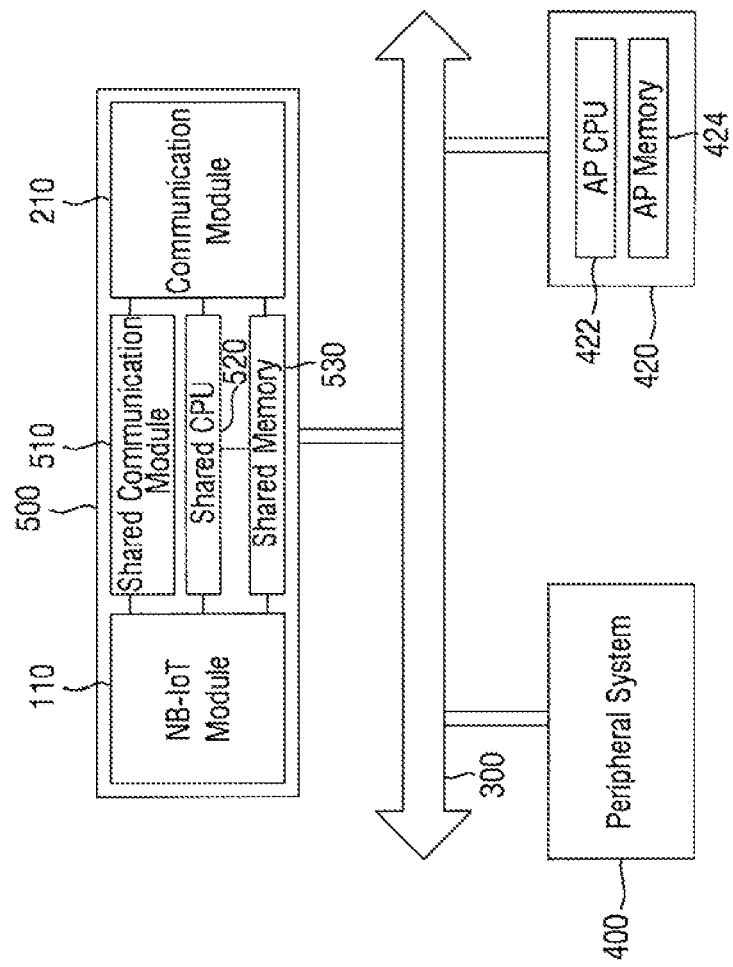
FIG. 3 illustrates an example of an electronic device and a system that support the narrowband internet of things according to some embodiments.

FIG. 2 illustrates an example of an electronic device and a system supporting the narrowband internet of things according to some embodiments. FIG. 3 illustrates an example of an electronic device and a system supporting the narrowband internet of things according to some embodiments.

Referring to FIG. 2, an integrated chipset 500 may include a narrowband internet of things module 110 and a communication module 210. For example, the integrated chipset 500 may be a single chip as embedded in a single package. Each of the narrowband internet of things module 110 and the communication module 210 may be connected to a shared central processing unit 520 and a shared memory 530. Thus, the narrowband internet of things module 110 and the communication module 210 may share the shared central processing unit 520 and the shared memory 530. For example, the shared memory 530 may store data and code associated with the narrowband internet of things module 110 and the communication module 210. For example, the shared central processing unit 520 may perform operations associated with the narrowband internet of things module 110 and the communication module 210 using the data and the code stored in the shared memory 530. Therefore, physical areas of the electronic device and the system may be reduced by sharing the central processing unit 520 and the shared memory 530.

According to an example embodiment, referring to FIG. 3, the integrated chipset 500 may include the narrowband internet of things module 110 and the communication module 210. The narrowband internet of things module 110 and the communication module 210 may be connected to each of the shared central processing unit 520, the shared memory 530, and a shared communication module 510. The narrowband internet of things module 110 and the communication module 210 may share the shared central processing unit 520, the shared memory 530, and the shared communication module 510. Thus, physical areas of the electronic device and the system may be reduced by sharing the central processing unit 520, the shared memory 530, and the shared communication module 510.

However, when both the narrowband internet of things module 110 and the communication module 210 require simultaneous works, the simultaneous works for the narrowband internet of things module 110 and the communication module 210 may not be simultaneously performed by the shared central processing unit 520 and the shared memory 530. Thus, the simultaneous works for the communication module 210 may be performed using an idle period of the narrowband internet of things module 110 because the narrowband internet of things module 110 does not require a paging time for receiving data during the idle period. It will be described below through FIGS. 4 and 5.

Figure 4:
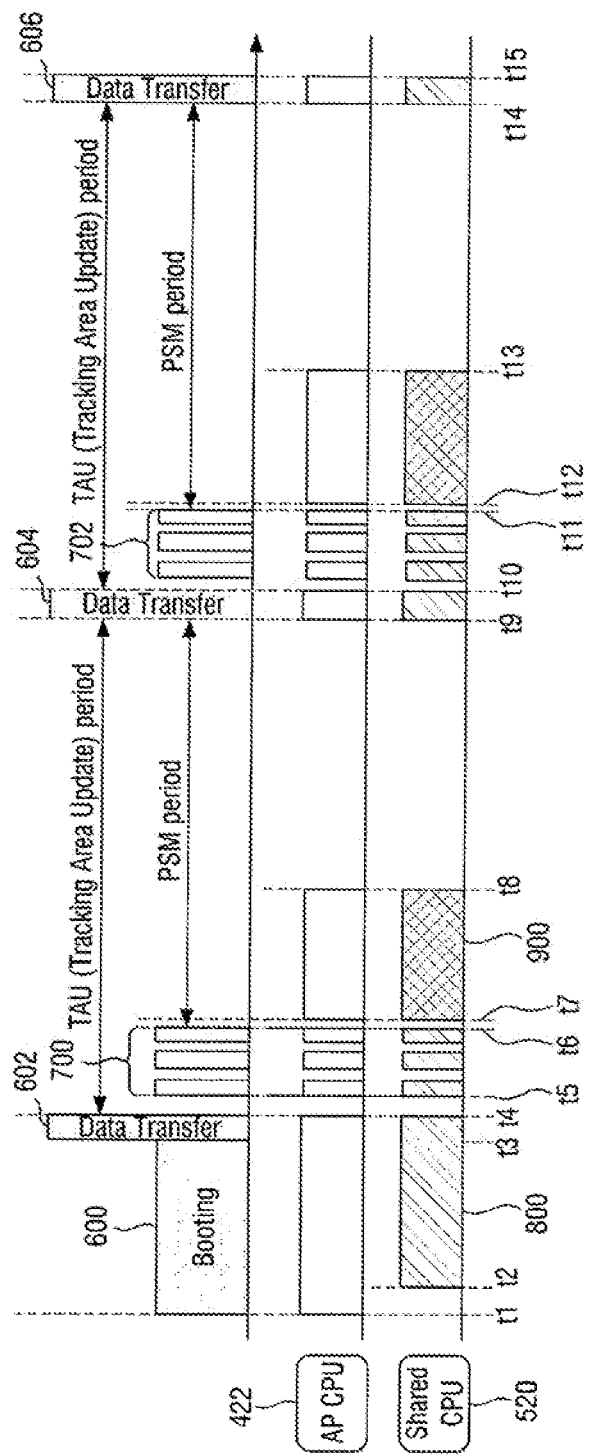
FIG. 4 illustrates an exemplary timing diagram for explaining an electronic device and a system that support the narrowband internet of things according to some embodiments.

FIG. 4 illustrate an exemplary timing diagram for explaining an electronic device and a system supporting the narrowband internet of things according to some embodiments. For example, the communication module 210 may be a global navigation satellite system (GNSS) module. For example, the communication module 210 may receive information regarding positions or locations of the electronic device and the system from satellites. Further, the communication module 210 may be implemented as various modules for communications.

Referring to FIG. 4, the electronic device and the system supporting the narrowband internet of things according to some embodiments may operate in first and second operation modes for an efficient battery management. For example, the first operation mode may include, e.g., an activation mode and a communication mode. The second operation mode may include, e.g., a power saving mode, an idle mode, and a non-communication mode. For example, when the electronic device and the system operate in the first mode, the electronic device (or the system) may have a booting time from a first time point t1 to a third time point t3 and may include a data transfer time from a third time point t3 to a fourth time point t4. For example, the electronic device (or the system) may receive code from an external storage device and may transmit code to the external storage device during the booting time. Operations during the booting time and the data transfer time will be explained with reference to FIGS. 6 through 9 to be described below.

According to some embodiments, the electronic device and the system supporting the narrowband internet of things may have a tracking area update (TAU) period from the fourth time point t4 to a ninth time t9. For example, the electronic device and the system may stop an active state for communication at the fourth time point t4 of the TAU period. For example, the electronic device and the system may start the active state for communication at the ninth time t9 of the TAU period.

In the second operation mode, the electronic device and the system may operate to reduce a power consumption of the electronic device and the system supporting the narrowband internet of things according to some embodiments. For example, the second operation mode may be one of a power saving mode (PSM) and an extended discontinuous reception (eDRX).

A case in which the electronic device and the system operate in the PSM will be described through FIG. 4, and a case in which the electronic device and the system operate in the eDRX will be described through FIG. 5 to be described below. For reference, as the electronic device supporting the narrowband internet of things requires a long operation time using a limited battery, power consumption reduction may be significant. The PSM in Release-12 and the eDRX in Release-13 may be introduced by 3rd Generation Partnership Project (3GPP) in order to reduce the power consumption of the electronic device supporting the narrowband internet of things.

Further, the PSM may improve power consumption reduction in a radio resource control (RRC) idle mode. For example, when the electronic device and the system supporting the narrowband internet of things operates in a power saving mode (PSM) period, the electronic device may have a state similar to power-off state and may not have paging times 700 and 702. Thus, the electronic device and the system may not be periodically powered on for the paging times 700 and 702 during the PSM period such that the power consumption for the paging times 700 and 702 may be eliminated. For example, according to Release-12, a power-off state of the electronic device (or the system) may be maintained for up to 13 days. According to Release-13, the power-off state of the electronic device (or the system) may be maintained for up to 413 days. Thus, the power consumption of the electronic device (or the system) supporting the narrowband internet of things may be reduced because electronic device may attempt to communicate on a weekly, monthly or yearly basis.

Further, the narrowband internet of things module 110 and the communication module 210 may share the shared central processing unit 520 and the shared memory 530 for a long PSM period of the electronic device (or the system) supporting the narrowband internet of things. For example, the narrowband internet of things module 110 may not use the shared central processing unit 520 and the shared memory 530 during the long PSM period such that the communication module 210 may use the shared central processing unit 520 and the shared memory 530 for the long PSM period.

Referring to FIGS. 3 and 4, the application processor central processing unit 422 for controlling the integrated chipset 500 may operate during a booting time 600, the data transfer times 602, 604, and 606, the paging times 700 and 702, and the operation period of the communication module 210. In addition, the narrowband internet of things module 110 may operate in a first period 800. For example, the first period 800 may include some of the booting time 600 (e.g., from the second time point t2 to the third time point t3), the data transfer times 602, 604 and 606, and the paging times 700 and 702. For example, the narrowband internet of things module 110 may operate in the first period 800 using the shared central processing unit (CPU) 520. For example, the narrowband internet of things module 110 may receive data from the shared memory 530 or may transmit data to the shared memory 530 in the first period 800. For example, the narrowband internet of things module 110 may perform operations regarding the narrowband internet of things.

For example, the communication module 210 may operate in some of the PSM period, e.g., in a second period 900. For example, the communication module 210 may operate in the second period 900 using the shared central processing unit (CPU) 520. For example, the communication module 210 may receive data from the shared memory 530 or may transmit data to the shared memory 530 in the second period 900. For example, the communication module 210 may perform operations regarding information of locations or positionings of the electronic device or the system. For example, the second period 900 for the communication module 210 may not overlap the first period 800 for the narrowband internet of things module 110. Thus, the narrowband internet of things module 110 and the communication module 210 may share the shared central processing unit 520 and the shared memory 530, by using the shared central processing unit 520 at different times from each other, without using the shared central processing unit 520 at the same time.

Figure 5:
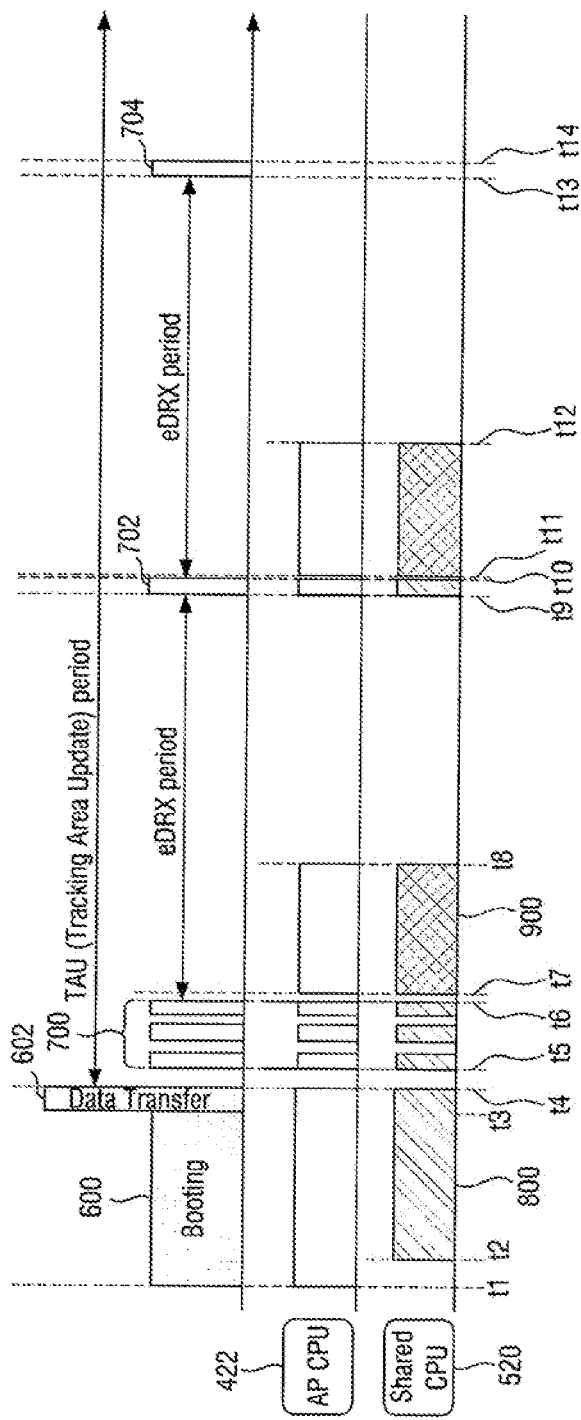
FIG. 5 illustrates an exemplary timing diagram for explaining an electronic device and a system that support the narrowband internet of things according to some embodiments.

FIG. 5 illustrates an exemplary timing diagram for explaining an electronic device and a system supporting the narrowband internet of things according to some embodiments. Referring to FIG. 5, extended discontinuous reception (eDRX) may be introduced in Release-13 and may have extended paging times 700, 702, and 704 in comparison to discontinuous reception (DRX) such that the eDRX may improve a power efficiency. In the DRX, a maximum paging cycle may be 2.56 s (seconds). For example, a device may wake up to receive paging messages every 2.56 s in the DRX. When the device operates in the eDRX, the device may wake up to receive paging message every 2611.4 s. Further, in Cat-M1, the paging cycle may extend to 2611.4 s (=43.69 min). In Cat-NB1, the paging cycle extends to 10485.76 s (=2.91 hours). Thus, inactive/sleep states of the electronic device (or the system) supporting the narrowband internet of things according to some embodiments may be allowed for tens of minutes to hours.

Figure 6:
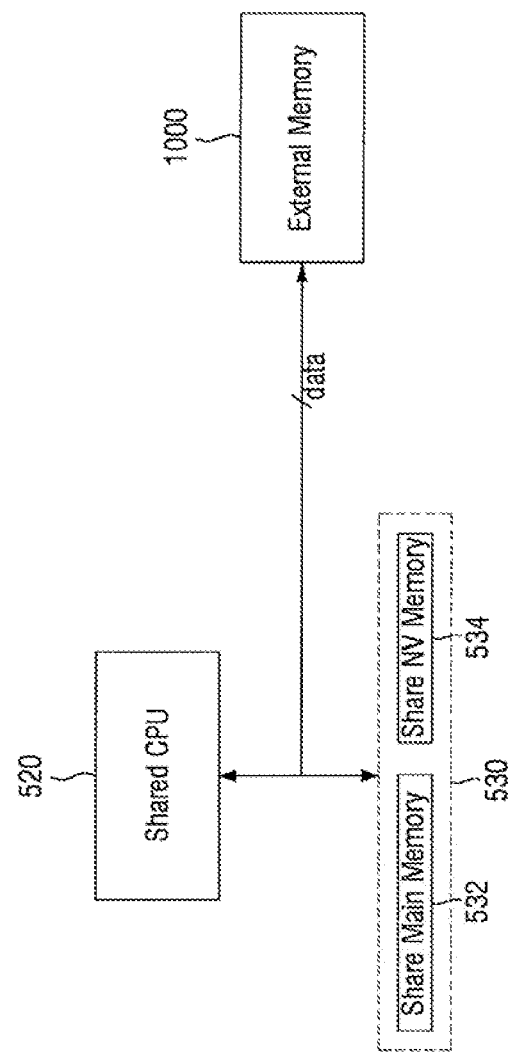
FIG. 6 illustrates an example for explaining data transmission and data reception of the electronic device and the system that support the narrowband internet of things according to some embodiments.
Figure 7:
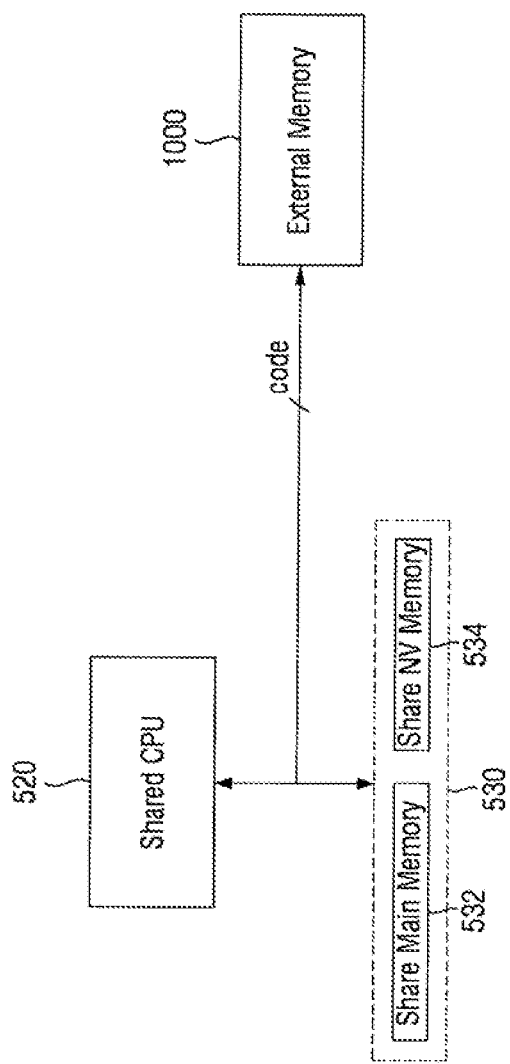
FIG. 7 illustrates an example for explaining data transmission and data reception of the electronic device and the system that support the narrowband internet of things according to some embodiments.

FIG. 6 illustrates an example for explaining data transmission and data reception of the electronic device and the system that support the narrowband internet of things according to some embodiments. FIG. 7 illustrates an example for explaining data transmission and data reception of the electronic device and the system that support the narrowband internet of things according to some embodiments.

Referring to FIG. 6, the shared memory 530 may include a shared main memory 532 and a shared nonvolatile memory 534. The shared main memory 532 may include an SRAM (Static RAM) that performs high-speed operations. The shared nonvolatile memory 534 may include a magnetic random access memory (MRAM). For example, the MRAM may have high reading and writing speeds, high durability, non-volatility, and low power consumption. Further, the MRAM may also store data from an external storage device or the shared central processing unit 520, using magnetic material as an information-storage medium. Thus, when the data are assigned to the shared nonvolatile memory 534 of the shared memory 530 from the external storage device 1000 for storing the nonvolatile data of the narrowband internet of things protocol software, the data from the external storage device 1000 may be quickly entered and restored in nonvolatile data without another storage/restore processes.

Further, when the external storage device 1000 is capable of performing eXecution in Place (XiP), an instruction code may be directly executed in the external storage device 1000 without being copied to the shared main memory 532. For example, the eXecution in Place (XiP) may be enabled when the external storage device 1000 is a NOR flash. For example, the eXecution in Place (XiP) may not be enabled when the external storage device 1000 is a NAND flash.

As memory cells of the NOR flash are connected to each other in parallel, the NOR flash may have both address lines and data lines such that random access to the NOR flash may be performed by byte units as operated in the RAM. However, as memory cells of the NAND flash are connected to each other in series, the NAND flash may not be read by byte units but may be read by page units in a read operation. A NAND flash supporting small page units may be read by an amount of 512 bytes at a time. A NAND flash supporting large page units may be read by an amount of 2 kilobytes at a time.

Further, the application processor central processing unit 422 may store the nonvolatile data in the shared nonvolatile memory 534 when the data to be transmitted to and received from the external storage device 1000 is nonvolatile data. At this time, the shared nonvolatile memory 534 may be, e.g., a MRAM, and may access the nonvolatile data at high speed. The nonvolatile data may be, e.g., network information, RF calibration data, and the like.

For example, the power consumption for transmitting and receiving the nonvolatile data to and from the external storage device 1000 may be minimized by storing the nonvolatile data that are stored in the external storage device 1000 and transmitted and received through the shared central processing unit 520 at the time of wake-up, in the shared nonvolatile memory 534, e.g., the MRAM. Further, a latency occurred in the process of transmitting and receiving the nonvolatile data between the shared central processing unit 520 and the external storage device 1000 may be reduced.

FIG. 7 illustrates an example for explaining code transmission and code reception of the electronic device and the system that support the narrowband internet of things according to some embodiments. FIG. 9 illustrates an example for explaining system code transmission and system code reception of the electronic device and the system that support the narrowband internet of things according to some embodiments.

Referring to FIG. 7, the shared memory 530 may include a shared main memory 532 and a shared nonvolatile memory 534 according to some embodiments. The shared main memory 532 may include, e.g., a static RAM (SRAM) that performs high-speed operation. The shared nonvolatile memory 534 may include, e.g., a magnetic random access memory (MRAM). For example, the MRAM may have high reading and writing speeds, high durability, non-volatility, and low power consumption while operations are performed. Further, the MRAM may also store codes from an external storage device or the shared central processing unit 520, using magnetic material as an information-storage medium. Thus, by assigning the code to the shared nonvolatile memory 534 of the shared memory 530 from the external storage device 1000 that stores, e.g., a sub-code, which is a part of the codes of the narrowband internet of things protocol software, the sub-code may be quickly entered and restored without separate store/restore processes.

Further, when the external storage device 1000 is capable of performing eXecution in Place (XiP), the external storage device 1000 and the shared central processing unit 520 may directly transmit and receive the code each other, without storing the code in the shared main memory 532. For example, the eXecution in Place (XiP) may be enabled when the external storage device 1000 is a NOR flash. For example, the eXecution in Place (XiP) may not be enabled when the external storage device 1000 is a NAND flash.

As memory cells of the NOR flash are connected to each other in parallel, the NOR flash may have both address lines and data lines such that random access to the NOR flash may be performed by bytes units as operated in the RAM. However, as memory cells of the NAND flash are connected to each other in series, the NAND flash may not be read by byte units but may be read in page units in a read operation. A NAND flash supporting small page units may read by an amount of 512 bytes at a time. A NAND flash supporting large page units may read by 2 kilobytes at a time.

Further, the application processor central processing unit may store the code, to be transmitted to and received from the external storage device 1000, in the shared nonvolatile memory 534. At this time, the shared nonvolatile memory 534 is, for example, the MRAM, and may quickly access the code.

Further, by storing the codes, which are stored in the external storage device 1000 and transmitted and received through the shared central processing unit 520 at the time of wake-up, in the shared nonvolatile memory 534, e.g., the MRAM, the power consumption for transmitting and receiving the code to and from the external storage device 1000 may be minimized. Further, a latency occurred in the process of transmitting and receiving the code between the shared central processing unit 520 and the external storage device 1000 may be reduced.

Various operations of methods described above may be performed as is suitable, such as by various hardware and/or software components, modules, and/or circuits. When implemented in software, the operations may be implemented using, for example, an ordered listing of executable instructions for implementing logical functions, and may be embodied in a processor-readable medium for use by or in connection with an instruction execution system, apparatus, or device, e.g., a single or multiple-core processor or processor-containing system.

In some embodiments, blocks or steps of a method or algorithm and functions described in connection with the embodiments disclosed herein may be embodied directly in hardware, in a software module executed by a processor, or in a combination of software and hardware. If implemented in software, the functions may be stored on or transmitted over as one or more instructions or code on a tangible, non-transitory computer-readable medium. A software module may reside in, for example, Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other suitable form of storage medium.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. An electronic system supporting narrowband internet of things (NB-IoT), the electronic system comprising:
   a NB-IoT circuit;
   a communicator;
   a shared central processor to control the NB-IoT circuit or the communicator;
   a shared memory to store data or code for the shared central processor, the shared memory being connected directly to the communicator and including a shared main memory and a shared nonvolatile memory; and an external storage device to transmit and receive the data or the code to and from the shared central processor and the shared memory, wherein the NB-IoT circuit has an idle period in which the NB-IoT circuit does not transmit or receive the data or the code, the communicator transmits or receives the data or the code in the idle period, and the NB-IoT circuit and the communicator use the shared central processor at different times from each other, without using the shared central processor at the same time.

2. The electronic system as claimed in claim 1, wherein the shared main memory includes an SRAM.

3. The electronic system as claimed in claim 1, wherein the shared nonvolatile memory includes an MRAM.

4. The electronic system as claimed in claim 3, wherein the shared nonvolatile memory stores the data from the external storage device or the shared central processor, using magnetic material as an information-storage medium.

5. The electronic system as claimed in claim 4, wherein the data stored in the shared nonvolatile memory can be read without accessing to the external storage device.

6. The electronic system as claimed in claim 3, wherein the shared nonvolatile memory stores the code from the external storage device or the shared central processor, using magnetic material as an information-storage medium.

7. The electronic system as claimed in claim 6, wherein the code stored in the shared nonvolatile memory can be read without accessing to the external storage device.

8. The electronic system as claimed in claim 7, wherein the code includes sub-code which is a part of the codes of a NB-IoT protocol software.

9. The electronic system as claimed in claim 1, when the external storage device is capable of performing execution in place (XiP), and an instruction code can be directly executed in the external storage device without being copied to the shared main memory.

10. The electronic system as claimed in claim 9, wherein the external storage device includes a NOR flash.

11. The electronic system as claimed in claim 1, when the external storage device is not capable of performing execution in place (XiP).

12. The electronic system as claimed in claim 11, wherein the external storage device includes a NAND flash.

13. The electronic system as claimed in claim 1, wherein the shared main memory and the shared nonvolatile memory are different types of memory.

14. The electronic system as claimed in claim 1, wherein a part of the data or the code are used only for the NB-IoT circuit, and another part of the data of the code are used only for the communicator.

* * * * *